Figure 1:
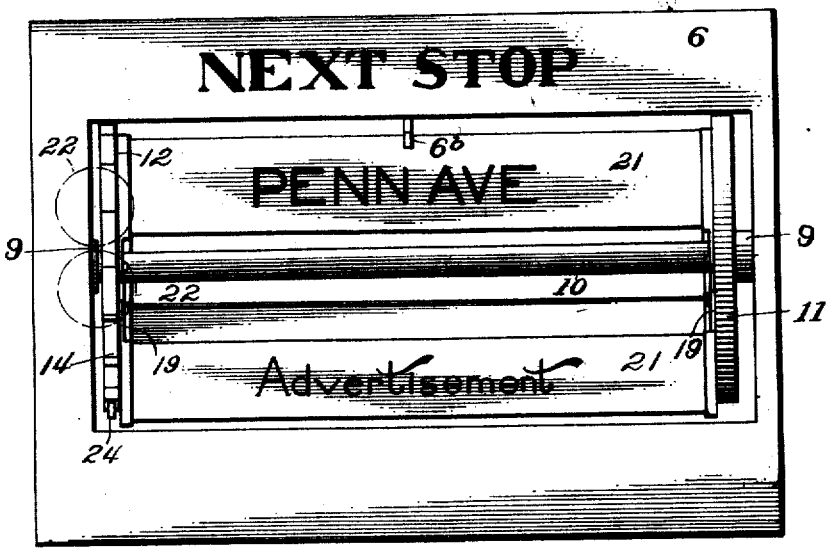

D. C. EVANS & O. Q. PATTERSON.
INDICATOR.
APPLICATION FILED MAY 3, 1906.

930,279.

Patented Aug. 3, 1909.
2 SHEETS—SHEET 1.

WITNESSES:

INVENTORS.
D. C. Evans,
O. Q. Patterson.
BY H. C. Evert & Co.
Attorneys

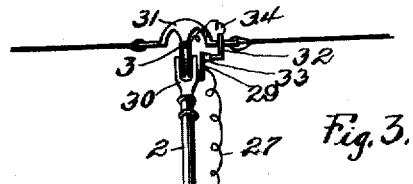
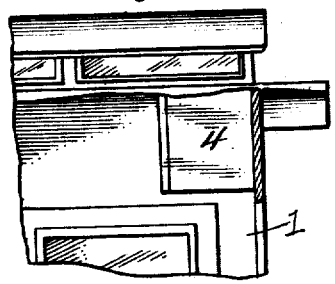
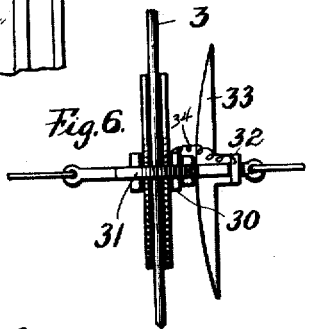
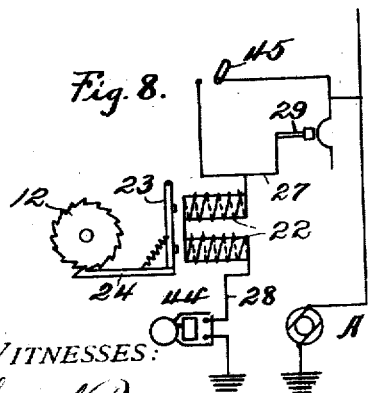
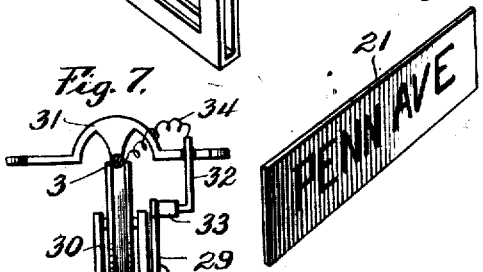

UNITED STATES PATENT OFFICE.

DAVID C. EVANS AND OLIVER Q. PATTERSON, OF UNIONTOWN, PENNSYLVANIA.

INDICATOR.

No. 930,279.      Specification of Letters Patent.     Patented Aug. 3, 1909.

Application filed May 3, 1906. Serial No. 315,015.

*To all whom it may concern:*

Be it known that we, DAVID C. EVANS and OLIVER Q. PATTERSON, citizens of the United States of America, residing at Uniontown, in the county of Fayette and State of Pennsylvania, have invented certain new and useful Improvements in Indicators, of which the following is a specification, reference being had therein to the accompanying drawing.

This invention relates to certain new and useful improvements in indicators, and more particularly to that type of indicator adapted to be electrically actuated in connection with street and railway cars.

Our invention has for its primary object the provision of novel means for indicating the different streets and stations which a car approaches, said means being automatically controlled and actuated by the car passing predetermined points along the entire route of the car. To this end, we have devised an indicator for displaying the name of each street or station a car approaches, and in connection with the indicator, we have also devised a novel advertising medium, which displays a plurality of advertisements, an advertisement being displayed each time the indicator is actuated.

The present invention is an improvement upon our street car indicator, No. 813,144, patented February 20th, 1906, and in the present invention we employ a portion of the indicator mechanism set forth in the above mentioned application, together with certain novel improvement which form the subject matter of this application.

With the above and other objects in view, which will more readily appear as the nature of the invention is better understood, the same consists in the novel construction, combination and arrangement of parts to be hereinafter more fully described and claimed, and referring to the drawing accompanying this application, like numerals of reference designate corresponding parts throughout the several views, in which:—

Figure 2:
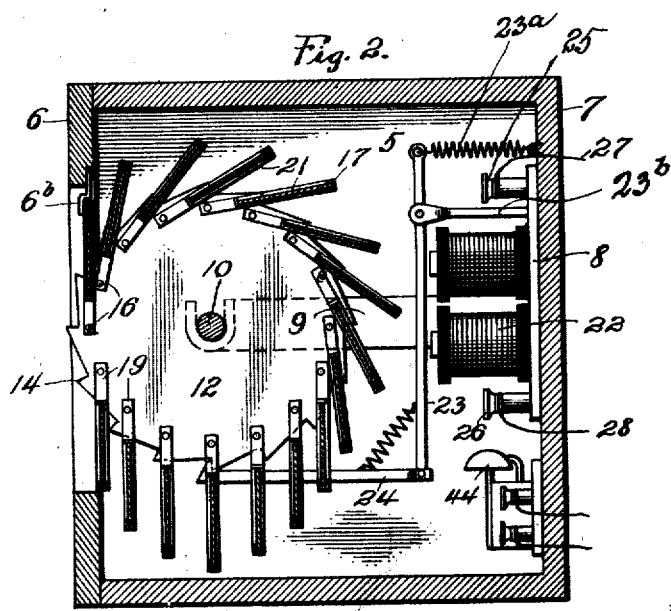

Figure 1 is a front elevation of our improved indicator, Fig. 2 is a vertical sectional view of the indicator casing, Fig. 3 is a fragmentary vertical sectional view of a street car equipped with our improved indicator, Fig. 4 is a vertical sectional view of a portion of the street car illustrating the indicator in side elevation, Fig. 5 is a perspective view of one of the plate holders used in connection with the indicator, Fig. 6 is a plan of a contact block as supported from a trolley wire, said block together with other mechanism being employed to actuate our improved indicator, Fig. 7 is a front elevation of the same, Fig. 8 is a diagrammatic view of the electrical connections of the indicator, Fig. 9 is a perspective view of one of the street and advertisement plates used in connection with the indicator, Fig. 10 is a detail sectional view of a portion of the mechanism showing modified form of construction for mounting the plate holder.

In the accompanying drawings, we have illustrated a conventional form of street car 1, which is electrically operated, a trolley pole 2 and trolley wire 3, together with other mechanism (not shown) being employed for this purpose.

Our invention resides in an indicator 4, which is preferably mounted in the forward end of the car 1, whereby it may be easily observed by the occupants of the car. The indicator comprises a casing 5 having a slotted front wall 6. The rear wall 7 of the casing carries a plate 8 having two outwardly extending side arms 9, 9 in the outer or free ends cut away to form bearings and in which is journaled a shaft 10, said shaft being located adjacent to the slotted front wall 6 of the casing. Upon the shaft at the ends thereof are mounted wheels 11 and 12, the wheel 12 being provided with teeth 14 to serve functionally as a ratchet wheel. The wheels are provided with a plurality of circumferentially arranged openings and in said openings are mounted a plurality of short rods or pins 16, said rods being suitably retained in engagement with said wheels. From the rods 16 are suspended a plurality of plate holders 17, each holder comprising a channel U-shaped frame 18 carrying pierced lugs 19, 19, to receive the rod 16, and having a slotted end 20, wherrby plates 21 may be placed within the holders. The one side of each plate is provided with the name of a street, while the opposite side is provided with a suitable advertisement or notification. The rods 16 are arranged so that a portion of the plate holder 17 will be suspended between the wheels 11 and 12, while the remainder of the plate holders will rest one upon the other, as illustrated in Fig. 2 of the drawings.

Upon the plate 8 within the casing 5 are mounted electromagnets 22 and pivotally mounted in front of said magnets is an armature 23 carrying a spring-held hook-shaped arm 24. The arm 23 is pivotally connected to the end of a forwardly projecting arm 23ᵇ secured to the wall 7. The electromagnets 22 are preferably located at the end of the box adjacent to the ratchet wheel 12 whereby the spring held toothed arm 24 may normally engage the teeth 14 of the wheel 12. The plate 8 within the casing 5 is provided with binding posts 25 and 26 and these posts connect by wires 27 and 28 respectively with an electrical circuit which operates the street car 1, the wire 27 passing upwardly through the car and along the trolley pole 2, to an insulated contact arm 29 carried by the harp 30 of said pole, while the wire 28 is grounded, by connecting it to one of the axles of the car or like piece of mechanism, which will insure a positive circuit, as will be presently described.

At each street along the route of a car line, we provide the trolley wire support 31 with a depending insulated arm 32 having a curved spring contact block 33. The arm 32 is connected by a wire 34 with the trolley wire 3 and the operation of our improved indicator is as follows:—As the car approaches a cross street, the contact arm 29 carried by the trolley will engage the spring contact block 33 carried by the depending arm 32 of the trolley wire support, and a circuit will be completed through the trolley wire 3 to the source of electrical energy A, through the ground B, wire 28 to the electromagnets 22, and through wire 27 to the arm 29, which will energize the electromagnets 22, and attract the armature 23, and through the medium of the toothed arm 24 rotate the ratchet wheel 12, which will in turn display the name of a street each time the electromagnets are actuated. The armature 23 is shifted clear of the cores of the magnets 22 when these latter are deënergized by a spring 23ᵃ which is attached to the wall 7 and the free end of the armature 23. As each sign plate 21 is brought to display position to expose the name of the street or station, it is engaged at its upper edge by a stop 6ᵇ and maintained in a vertical position. The stop 6ᵇ is carried by the casing at the upper edge of the exposure opening and temporarily maintains the plates separately in a vertical position. On the next operation of the wheels that plate which has been temporarily maintained by the stop 6ᵇ is shifted off the stop and drops from the position referred to, turns on its rods or pins so that when the plate drops, the reversed side thereof will be exposed through the opening, such reversed side of the plate may be provided with an advertisement or any other inscription. The plates 21 may be readily changed in their holders by bringing each holder around to the opening in the front wall of the casing, and holding the plates projecting out through the front wall, so that the plates may be withdrawn through the opening 20, the perforated lugs or hangers 19 being of sufficient length to permit of this operation.

In Fig. 10 of the drawings is shown a slight modification in a manner of mounting the plate holders 17. The apertured lugs or hangers 19 are fastened to the wheels 12, 14 by screws 15, on which said lugs or hangers work freely, thus dispensing with the pins or rods 16.

In connection with the indicator, we can arrange an alarm 44 such as an electrical bell, said bell being cut in upon the indicator circuit, to sound an alarm at each station or street approached by a car. A button or switch 45, located convenient to the operator of a car can also be used, whereby when a street or station is passed without stopping, and the trolley contact should fail to operate, the motorman or operator of a car can easily close the indicator circuit, actuate the same and thus insure a perfect operation of the indicator.

The present invention resides particularly in the construction illustrated in Figs. 2 and 5 of the drawings, the remainder of the mechanism illustrated in this application being disclosed in the Letters Patent heretofore mentioned.

Such changes in the construction and operation of our improved indicator as are within the scope of the appended claim, may be resorted to without departing from the spirit and scope of the invention.

What we claim and desire to secure by Letters Patent, is:—

In an indicator, sign actuating means, means for controlling said sign-actuating means connected to a trolley of a car, and a sign indicator comprising a plurality of substantially U-shaped holders, each of the holders being formed with ends having ears, one of said ends having continuous spaced side walls between which a sign can pass, the middle body portion of the holder being formed with a groove and the remaining end being formed with a corresponding groove.

In testimony whereof we affix our signatures in the presence of two witnesses.

DAVID C. EVANS.
OLIVER Q. PATTERSON.

Witnesses:
DAVID L. EVANS,
CHAS. A. LANGHEAD.